United States Patent
Meirav et al.

(10) Patent No.: US 9,919,287 B2
(45) Date of Patent: Mar. 20, 2018

(54) ARTICLES OF MANUFACTURE FORMED OF AMINE-SUPPORT PARTICLES AND METHODS OF MAKING THEREOF

(71) Applicants: enVerid Systems, Inc., Newton, MA (US); Massachusetts Institute of Technology, Cambridge, MA (US)

(72) Inventors: Udi Meirav, Newton, MA (US); Trevor Alan Hatton, Sudbury, MA (US); Fritz Simeon, Quincy, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 14/760,395

(22) PCT Filed: Jan. 10, 2014

(86) PCT No.: PCT/US2014/011078
§ 371 (c)(1),
(2) Date: Jul. 10, 2015

(87) PCT Pub. No.: WO2014/110395
PCT Pub. Date: Jul. 17, 2014

(65) Prior Publication Data
US 2015/0352518 A1   Dec. 10, 2015

Related U.S. Application Data

(60) Provisional application No. 61/751,070, filed on Jan. 10, 2013.

(51) Int. Cl.

| | | |
|---|---|---|
| *B01J 20/32* | (2006.01) | |
| *B01J 20/08* | (2006.01) | |
| *B01J 20/02* | (2006.01) | |
| *B01J 20/28* | (2006.01) | |
| *B01J 20/30* | (2006.01) | |
| *B01J 20/20* | (2006.01) | |
| *B01J 20/22* | (2006.01) | |
| *B01J 20/26* | (2006.01) | |
| *B01J 20/10* | (2006.01) | |
| *B01D 53/02* | (2006.01) | |

(52) U.S. Cl.
CPC ............. *B01J 20/08* (2013.01); *B01D 53/02* (2013.01); *B01J 20/0248* (2013.01); *B01J 20/103* (2013.01); *B01J 20/20* (2013.01); *B01J 20/22* (2013.01); *B01J 20/262* (2013.01); *B01J 20/28016* (2013.01); *B01J 20/28042* (2013.01); *B01J 20/3007* (2013.01); *B01J 20/3021* (2013.01); *B01J 20/3042* (2013.01); *B01J 20/3078* (2013.01); *B01D 2253/20* (2013.01); *B01D 2253/304* (2013.01); *B01D 2257/504* (2013.01); *B01D 2259/4566* (2013.01); *B01J 2220/42* (2013.01); *Y02C 10/08* (2013.01)

(58) Field of Classification Search
CPC ....................................................... B01J 20/32
USPC ......................................................... 502/401
See application file for complete search history.

(56) References Cited

U.S. PATENT DOCUMENTS

| | | |
|---|---|---|
| 5,876,488 A | 3/1999 | Birbara et al. |
| 6,395,678 B1 | 5/2002 | Summers et al. |
| 6,726,558 B1 | 4/2004 | Meirav |
| 6,866,701 B2 | 3/2005 | Meirav |
| 6,908,497 B1 | 6/2005 | Sirwardane |
| 8,157,892 B2 | 4/2012 | Meirav |
| 8,690,999 B2 | 4/2014 | Meirav et al. |
| 2005/0284291 A1 | 12/2005 | Alizadeh-Khiavi et al. |
| 2006/0165574 A1 | 7/2006 | Sayari |
| 2008/0119356 A1 | 5/2008 | Ryu et al. |
| 2008/0293976 A1 | 11/2008 | Olah et al. |
| 2010/0154636 A1 | 6/2010 | Liu et al. |
| 2011/0198055 A1 | 8/2011 | Meirav et al. |
| 2011/0296872 A1 | 12/2011 | Eisenberger |
| 2012/0076711 A1 | 3/2012 | Gebald et al. |
| 2014/0298996 A1 | 10/2014 | Meirav et al. |

FOREIGN PATENT DOCUMENTS

| | | |
|---|---|---|
| CN | 101500704 A | 8/2009 |
| GB | 1 283 822 A | 8/1972 |
| JP | 5-161843 A | 6/1993 |
| WO | WO 88/05693 A1 | 8/1988 |
| WO | WO 2011/146478 A1 | 11/2011 |
| WO | WO2012134415 A1 | 10/2012 |
| WO | WO 2012/158911 A2 | 11/2012 |
| WO | WO 2014/110395 A1 | 7/2014 |

OTHER PUBLICATIONS

Goeppert et al., "Carbon Dioxide Capture from the Air Using a Polyamine Based Regenerable Solid Adsorbert", J.Am. Chem. Soc., vol. 133, No. 50, Nov. 21, 2011, p. 20164-20167.
International Search Report for International Application No. PCT/US2014/011078, date mailed, May 5, 2014.
Supplementary European Search Report issued for EP 14737604, mailed on Jul. 27, 2016.
Chinese Office Action issued in Chinese Patent Application No. 201480006394.X, dated Sep. 14, 2016, 19 pages.

*Primary Examiner* — Edward Johnson
(74) *Attorney, Agent, or Firm* — Cooley LLP

(57) ABSTRACT

Embodiments of the present invention feature article of manufacture, methods of making and methods of using a paste of the reaction product of an organic amine and support particles, shaped as pellets, sheets, films, rings discs or other forms useful for scrubbing carbon dioxide from emissions and the atmosphere.

17 Claims, 4 Drawing Sheets

ARTICLES OF MANUFACTURE FORMED OF AMINE-SUPPORT PARTICLES AND METHODS OF MAKING THEREOF

CROSS REFERENCE TO RELATED APPLICATIONS

This application is a U.S. National Phase application of International Application No. PCT/US2014/011078, filed on Jan. 10, 2014 which claims the benefit of U.S. Provisional Application No. 61/751,070, filed on Jan. 10, 2013, hereby incorporated by reference.

FIELD OF THE INVENTION

The embodiments of the invention encompass compositions and articles of manufacture capable of capturing carbon dioxide and made from organic amine materials and high surface area particles. The adsorbent for scrubbing carbon dioxide can be formed into shapes either as individual particles in a fixed bed or as a single monolithic shape as necessary for a particular use. The method encompassed by the invention includes the combination of at least one organic amine, at least one type of high surface area particle, and water to form a surface coated particle that is dried and formed into a desired shape.

BACKGROUND OF THE INVENTION

Solid sorbents have been used to scrub or remove carbon dioxide from gases emitted from combustion processes and the atmosphere, as well as air in closed quarters, such as in submarines and spacecraft. One particular class of solid sorbents for scrubbing carbon dioxide is solid-supported amines. These sorbents are often made using either expensive solvents or water soluble alcohols such as ethanol or methanol. However, such solvents have made the process of making these solid sorbents either too expensive for large scale commercial development or too dangerous as some solvents are flammable. Further complications arise because typically the solid sorbents comprise very small functionalized particles which can be carried off in the movement of gases or are difficult to handle due to their limited size and shape.

Thus, a need in the art arose for solid sorbents which can be more readily handled, formed into desired shapes and articles, and not subject to movement due to the flow of air through or about the particles at flow rates suitable for applications, such as indoor ventilation.

SUMMARY OF THE INVENTION

The invention encompasses a solid supported amine sorbent for scrubbing carbon dioxide, formaldehyde, or other gases from indoor air comprising at least one support particle and at least one organic amine, wherein the organic amine and support particles are aggregated to form a larger pellets, clusters, or shaped form to be used as a fixed bed for flow-through adsorption. In one embodiment, the organic amine is a primary, secondary amine, or a compound having both primary and secondary amines. The amines include, but are not limited to polyethylenimine (PEI), aziridine, ethanolamine, diethanolamine, triethylenetetramine, tetraethylenepentamine, pentaethylenehexamine, or mixtures thereof. In another embodiment, the support particle has a composition of carbon, silica alumina, or a combination thereof. Typically, the support particle is fumed, pyrolytic or precipitated. In another embodiment, the solid sorbent for scrubbing carbon dioxide further comprises a chemical activator, such a polyethylene glycol.

In another embodiment, the solid sorbent for scrubbing carbon dioxide is shaped in the form of a pellet, filament, sheet, or globules. Alternatively, the shaped is in the form of a cylinder, sphere, spheroid, ellipsoid, cube, rectangle, triangle, ring, or disc. In another embodiment, the particle or shaped form has at least one dimension greater than about 0.1 mm. Alternatively, the dimension is greater than about 10 mm. Large shaped forms are referred to as monoliths.

Another embodiment of the invention encompasses a method of making a paste or solid sorbent for scrubbing carbon dioxide comprising adding at least one organic amine to at least one support particle and water to form a mixture; mixing the mixture; and forming a paste. Optionally, the method may include a drying step to remove water from the mixture and form a paste. The method may further comprise extruding or molding the paste to form a shaped solid adsorbent for scrubbing carbon dioxide.

In another embodiment of the invention encompasses a method of making a solid sorbent comprising adding at least one organic amine to at least one support particle and water to form a mixture; mixing the mixture, extruding or molding the mixture to form a shaped product, and drying the shaped product to remove the water and forming a solid adsorbent for scrubbing carbon dioxide or other gases.

In one embodiment of the method, the organic amine is present in an amount of about 10% to 60% by weight. In another embodiment, the mixture is about 20% to 50% by weight organic amine and 80% to 50% support particle. In yet another embodiment, the ratio of organic amine and support particle to water is about 1:2-11 by weight. Alternatively, in another embodiment, the ratio of organic amine and support particle to water is about 1:7 by weight.

In the method of making a solid sorbent for scrubbing carbon dioxide, the drying step is performed by drying during the extrusion process, heat drying, air drying, or vacuum processing. In one embodiment, the drying step is a heat drying step and is performed at a temperature of about 70° C. to about 120° C. and for a time of about 1 to about 24 hours.

In one embodiment of the method of making a solid sorbent for scrubbing carbon dioxide, the extruding step extrudes to form of pellets, filaments, sheets, globules, or shapes the solid sorbent for scrubbing carbon dioxide into cylinders, spheres, spheroids, ellipsoids, cubes, rectangles, triangles, rings, or discs.

DETAILED DESCRIPTION OF THE INVENTION

Figure 1:
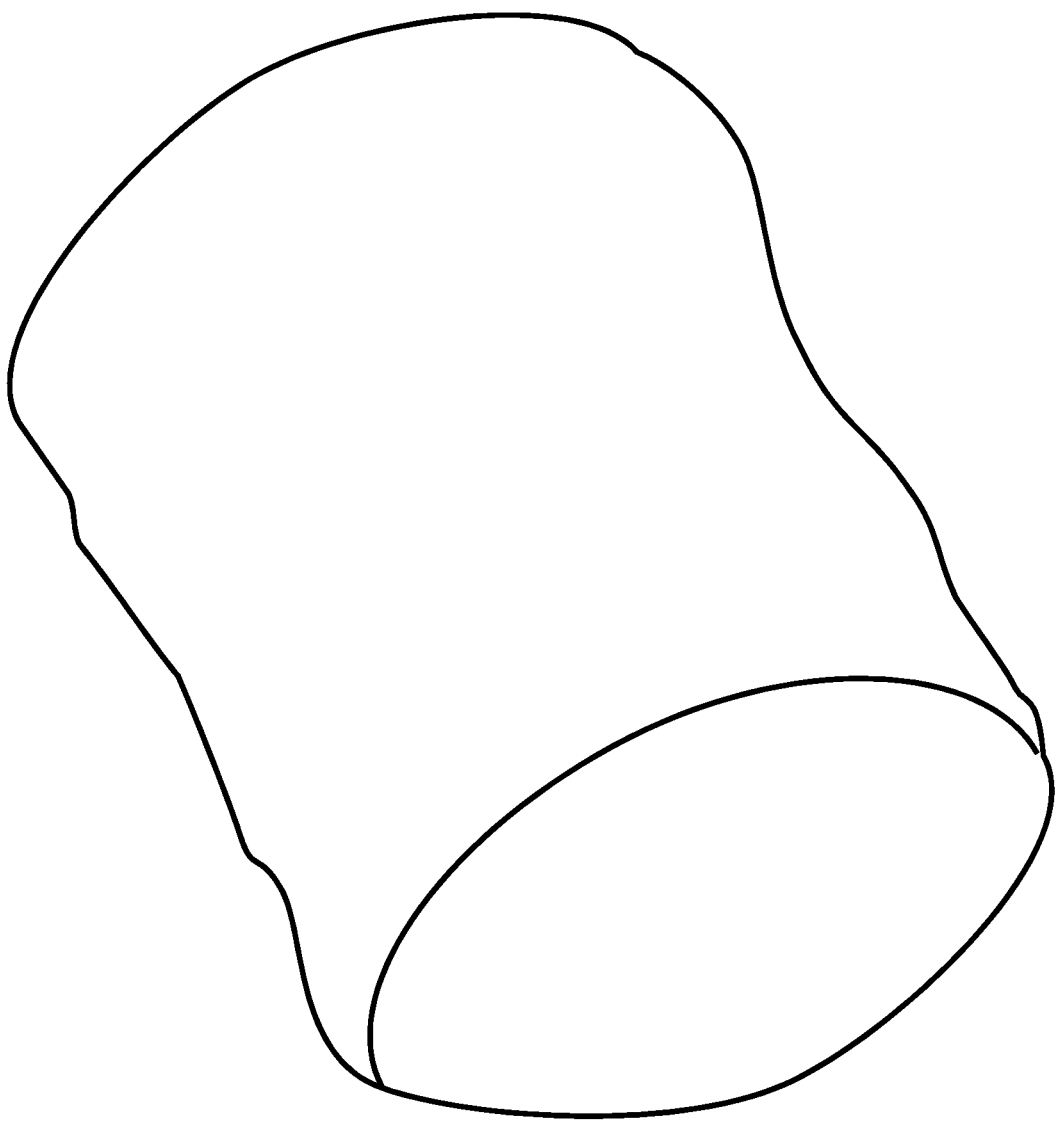
FIG. 1 illustrates a pellet of the invention wherein the size of the pellet is greater than that of the individual support particle.

The adsorbent encompassed by the invention are capable of adsorbing carbon dioxide and other chemical species over a period of time. Not to be limited by theory, but it is believed that the organic amine covering the support particle performs two functions. Firstly, the organic amine captures or bonds to carbon dioxide in a manner that can remove carbon dioxide from gasses. This capturing may be reversible or irreversible depending on the conditions. Secondly, the organic amine serves as a binding agent to help form clusters of support particles that can be shaped into a variety of forms depending upon end use.

The adsorbent of the invention features solid sorbents which can be readily handled, formed into shapes or articles and not subject to movement due to the flow of gases through or about the solid sorbent at flow rates suitable for applications such as indoor ventilation and air purification. These adsorbent for scrubbing carbon dioxide can be used as articles used to scrub, capture, or remove carbon dioxide, formaldehyde, and/or other contaminants from indoor air in buildings and vehicles, or gases produced in combustion processes, such as exhaust, atmospheric gases, or gases containing large amounts of carbon dioxide due to industrial output or biological sources. As used herein, gases having carbon dioxide includes, but is not limited to, gases comprising carbon dioxide in whole or in part. The term does not suggest or imply that the gas comprises only carbon dioxide.

One embodiment of the present invention is directed to an article of manufacture comprising a paste of the reaction product of an organic amine and support particles. As used herein, the term "paste" refers to a smooth or semi-smooth thick flowable or malleable material having a large solids content held in suspension in a liquid. Typically, the paste is a thick fluid of viscosity in the range of about 10,000 to about 10,000,000 centipoise (cP); and preferably the viscosity is about 100,000 to about 2,000,000 cP.

In another embodiment, the paste can be extruded through orifices or screens to form pellets, filaments, sheets, globules, and other shapes as desired for the end use. Further, paste can be molded or poured into forms including, but not limited to, filaments, sheets, cylinders, spheres, cubes, rectangles, triangles, rings, discs, or forms designed to snugly fit in a specialized shaped container or receptacle. In fact, the paste may be allowed to take any shape, such as that necessary to fill a void in machinery, and if desired the product can be separated into parts to form clusters of particles. In other words, the adsorbent for scrubbing carbon dioxide or other gases may be shaped into a pellet or cluster of particles necessary to fill a compartment wherein the scrubbing is desired to take place. The adsorbent may also assume an amorphous shape, separated into pieces or clusters of particles of a desired size to achieve the design objectives of the scrubbing system including contact area, air flow resistance, and holding the adsorbent in place. The adsorbent may also include a porous cluster or shape wherein gas may flow through the porous cluster or shape. The sorbent may be formed into a monolith that is perforated with holes or channels for gas to flow through. One or more monoliths may replace a bed of sorbent particles where during scrubbing the gas is forced through or along the monolith. The adsorbent for scrubbing carbon dioxide may also form one or more clusters, globules, shaped forms, pellets or extrudates. As used herein, the term "shaped form" refers to a three dimensional design or shape which is preconceived as in a molded or sculpted article.

In one embodiment, the adsorbent for scrubbing carbon dioxide may be shaped into a cluster, form, pellet or extrudate having at least one dimension greater than about 0.1 mm. Alternatively, the dimensions may be in the range of about 0.25 mm to about 1 mm. Thus, the adsorbent for scrubbing carbon dioxide can be grouped or packed into a bed and resist movement with the flow of fluids within and about the adsorbent.

Turning to FIG. 1, an article of manufacture in the form of a pellet, generally designated by the numeral 11, embodies the features of the present invention. Pellet 11 comprises an organic amine and support particles. By way of example, pellet 11 has a height, width or depth, depending on the orientation of the pellet and the designation of top and bottom, front or back, which can be arbitrary, that is greater than 0.1 mm. Other embodiments feature at least one dimension up to or exceeding 10 mm, 20 mm, or 50 mm. For example, in the case of spheroids the dimensions are about 0.3 mm to about 1 mm, and alternatively the range may have an upper limit of 3 mm. In the case of extrudates, the diameter is about 0.5 mm to about 1 mm and/or the extrudate may have a length of a few mm, but no more than about 10 mm. A packed bed of pellets (11) can support movement of gases around the individual pellets (11) or through the pellets (11) due to the porous nature of the grouping of individual support particles. Each pellet (11) has a plurality of support particles which are bonded or affixed to each other wherein the organic amine, by itself or with additional binders covers and bonds the support particles. Without being bound to a method of formation, it is presently contemplated that the organic amine forms bonds with a plurality of particles to bind the particles.

The adsorbent for scrubbing carbon dioxide of the invention comprises at least one organic amine combined with a support particle to form a cluster product capable of capturing or removing carbon dioxide. Optionally, the adsorbent for scrubbing carbon dioxide may also contain additional ingredients such as binders or chemical activators. For example, the binders and chemical activators may facilitate binding the support particles, drying, alter pH levels, and hinder amine oxidation, among other properties.

As used herein unless otherwise defined, the term "organic amine" refers to an organic molecule having at least one amine functional group. Typically, the organic amine has at least one alkane, alkene, alkyne, alkyl, or aryl group. The organic amine may have multiple alkanes, alkenes, alkynes, alkyl, aryl groups, or combinations thereof. While the amine can be a primary, secondary or tertiary amine, preferably the amine is a primary or secondary amine and more preferable a secondary amine. The invention encompasses molecules having a mixture of primary, secondary, and/or tertiary amines.

Typical amines used in the invention include, but are not limited to, polyethylenimine (PEI), aziridine, ethanolamine, diethanolamine (DEA), triethylenetetramine, tetraethylenepentamine (TEPA), pentaethylenehexamine (PEHA), 2-amino-2-methyl propanol (AMP), and mixtures thereof. Preferably, the amines include polyethylenimine (PEI), diethanolamine (DEA), triethylenetetramine, tetraethylenepentamine (TEPA), or pentaethylenehexamine. More preferably the amines include polyethylenimine (PEI), diethanolamine (DEA), or tetraethylenepentamine. Organic amines of the invention may be purchased through commercial vendors such as Sigma Aldrich (Milwaukee, Wis.) or BASF (Florham Park, N.J.).

The support particle includes, but is not limited to, a generally inert particle capable of binding with the organic amine and forming a cluster or shaped form upon extrusion or drying. For example, support particles may have a composition of carbon, silica, alumina, aluminosilicates, or combinations thereof. In the case of silica, the support particle is preferably of a fumed, pyrolytic, or precipitated type. Similarly, in the case of alumina, the support particle is preferably of a fumed, pyrolytic, or precipitated type. In the case of carbon, the support particle is preferably carbon black, porous carbon, or carbon nanoparticles. The invention also encompasses mixtures of support particles. Typically, the mixtures are combined in a desired weight ratio. For example, a mixture of fumed silica and fumed alumina may be combined in a weight ratio of about 5:1, preferably about 4:1, and more preferably about 3:1.

The support particles can be either manufactured or purchased through commercial vendors. Examples of commercially available silica include Cab-O-Sil© sold by Cabot Corporation (Boston, Mass.) or Aerosil© or Sipernat© sold by Evonik Industries (Parsippany, N.J.). Examples of commercially available carbon is Carbon Pearls sold by Cabot Corporation. Examples of commercially available alumina include the CP product line by BASF Corporation.

The adsorbent for scrubbing carbon dioxide may include one or more chemical activators to the organic amine, support particles or paste. These chemical activators may facilitate wetting or bonding of individual support particles and/or drying of the products. Examples of activator or modifier include, but are not limited to, polyethylene glycol or polyvinyl alcohol. Other examples of chemical activators include, but are not limited to, organic binders, polymerization catalysts and agents, cellulose, and alkaline salts.

The invention also encompasses methods of making an adsorbent for scrubbing carbon dioxide or formaldehyde. The method for making the adsorbent comprises adding at least one organic amine to at least one support particle and water to form a mixture; mixing the mixture, if needed, partially drying the mixture to remove some of the water and form a product in the form of a paste, and extruding or molding the paste to form a shaped solid adsorbent. After shaping, the shaped forms are dried as described herein. Optionally, the method includes an additional step of adding at least one chemical activator to the mixture. The order of mixing may be altered such as combing the organic amine with the water prior to adding the support particle. Hence an alternative embodiment of the method for making the solid adsorbent for scrubbing carbon dioxide comprises adding at least one organic amine to at least one support particle and water to form a mixture; mixing the mixture, extruding the mixture to form a shaped product, and drying the shaped product to remove the water and forming a solid adsorbent for scrubbing carbon dioxide.

The ratio of organic amine to support particle should be sufficient to coat and bind the support particle in a manner sufficient to impart carbon dioxide adsorbing properties to the material. The ratio of materials will depend on a number of considerations including, but not limited to, surface area, stability, or cost benefit. Increasing the amount of amine is generally expected to increase $CO_2$ capture or removal; however, too much amine can lead to reduced active surface area, thereby undermining the performance. Also, too much amine content may lead to weaker binding of the amines and instability of the material.

Typically, the mixture is about 10% to 60% by weight organic amine and 90% to 40% by weight support particle. Preferably, the mixture is about 20% to 50% by weight organic amine and 80% to 50% by weight support particle. Most preferably, the mixture is about 30% to 50% by weight organic amine and 70% to 50% by weight support particle. However, one of ordinary skill in the art with little or no experimentation can vary the amounts depending upon the amine and support particle used.

The amount of water used in the process will depend on the desired properties of the adsorbent for scrubbing carbon dioxide. For instance, the greater amount of water used the easier it is to mix the ingredients; however, large amounts of water need to be removed after mixing and before a stable paste is obtained and require longer drying times or harsher drying conditions. In contrast, small amounts of water can create a very dense paste that is difficult to mix. Typically, the ratio of dry ingredients to water is about 1:2-11 by weight. Preferably, the ratio of dry ingredients to water is about 1:5-9 by weight. Most preferably, the ratio of dry ingredients to water is about 1:7 by weight.

Other volatile solvents can be used instead, including organic alcohols. However, while organic alcohols may provide good technical results, they also introduce cost and safety disadvantages in a commercial or industrial setting.

The solid adsorbent for scrubbing carbon dioxide is substantially free of organic solvents. As used herein unless otherwise defined, the term "substantially free of organic solvents" refers to a solid adsorbent for scrubbing carbon dioxide having less than 1% by weight of organic solvents. Preferably, solid adsorbent for scrubbing carbon dioxide having less than 0.5% by weight organic solvents and more preferably, less than 0.1% by weight of organic solvents. By organic solvents it is meant solvents used during the mixing step and not the organic amine.

The drying step may be conducted by any method known in the art as long as the drying process does not damage the adsorbent for scrubbing carbon dioxide. Such drying methods are described in Catalyst Manufacture by Alvin b. Stiles (2d edition, CRC Press, 1995). Commonly, the known drying methods include, but are not limited to, drying during the extrusion process, heat drying, air drying, drying under a vacuum (vacuum processing), and the like. Drying may be carried out at elevated temperatures relative to water until water removal is complete. As recognized by the skilled artisan, drying conditions will depend upon a variety of factors such as the temperature, the amount of water present, whether a vacuum is used, the amount of time for drying, and the amount of acceptable residual water. For example, during heat drying typically the temperature may be about 70° C. to about 120° C., preferably about 80° C. to about 110° C., and more preferably the temperature during drying is about 90° C. to about 100° C. During the heat drying step, typically the time for drying may be about 1 to about 24 hours, preferably about 2 to about 12 hours, and more preferably about 3 to about 6 hours. As recognized by the skilled artisan, if a vacuum is used, then a skilled artisan may use lower temperatures and shorter drying times. For example, the drying step under vacuum may be carried out for about 1 hour at about 70° C.

Figure 2:
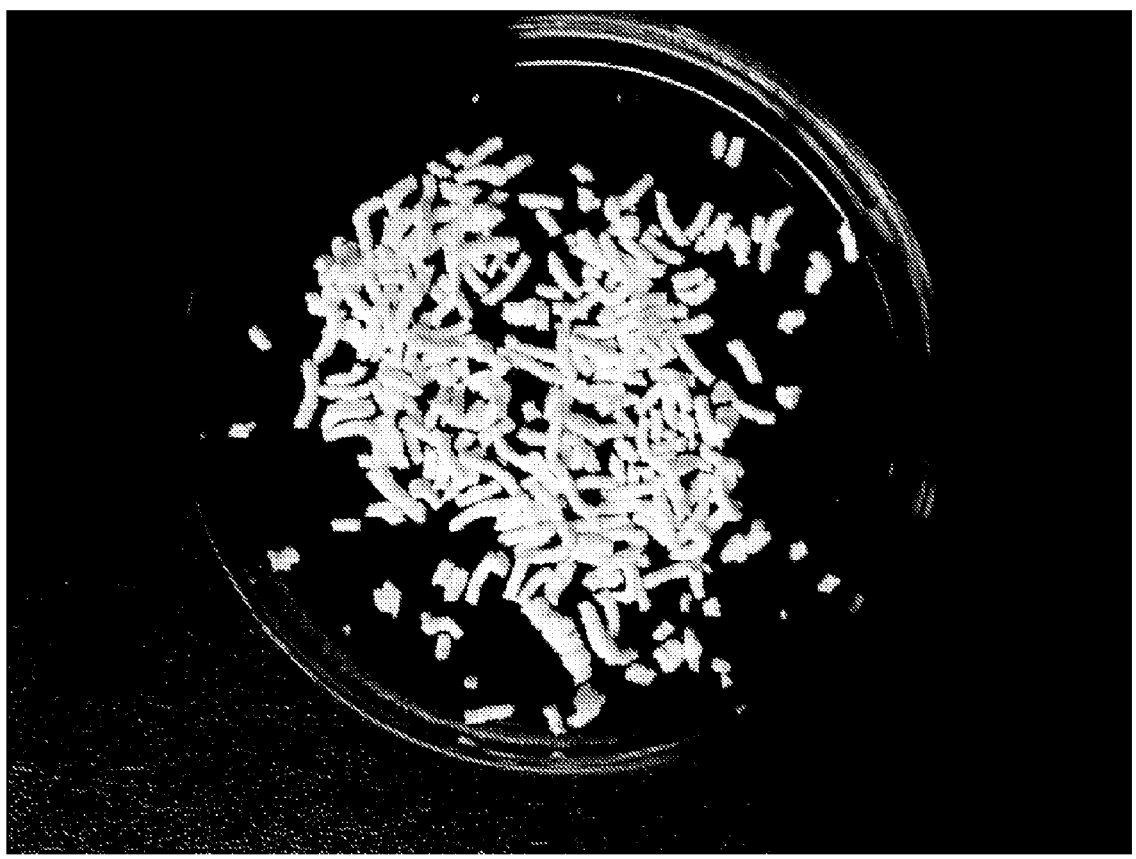
FIG. 2 illustrates a photograph of an adsorbent for scrubbing carbon dioxide of the invention, wherein the product is extruded into the shape of a small cylinder, where the support particles bonded to each other to form one or more clusters.

The duration and temperature of the drying may determine the brittleness of the solid adsorbent for scrubbing dioxide, such as the pellets (11) of FIG. 1 or FIG. 2. The amount of residual water may affect the adsorption kinetics with water hindering access of gas molecules to the active amine sites, as well as the production costs associated with drying times and energy usage.

The apparatus for drying includes, but is not limited to, a fixed oven, a sealed chamber for vacuum or ambient control, or a moving belt oven.

The extrusion step typically consists of extruding the paste-like mixture from an apparatus to shape the adsorbent. The extrusion step may be carried out using techniques commonly known to the skilled artisan such as those found in Catalyst Manufacture (see above). In one example, the mixture may be extruded into the form of pellets, filaments, sheets, globules, and other shapes as desired for the end use. Alternatively, the mixture can be extruded into molds or poured into forms including, but not limited to, filaments, sheets, cylinders, spheres, spheroids, ellipsoids, cubes, rectangles, triangles, rings, or discs. The dimensions of the extruded adsorbent for scrubbing carbon dioxide are discussed above.

The optional step of adding at least one chemical activator or inhibitor to the mixture can be performed at any time prior to extrusion. Since the chemical activators may facilitate wetting or bonding of individual support particles and/or drying of the products, a skilled artisan readily knows when to add the chemical activator to achieve the desired purpose. For example, a chemical activator such as polyethylene glycol or polyvinyl alcohol can be added to the mixture, water, organic amine, or support particle during the mixing step. Other examples of chemical activators include, but are not limited to, organic binders, polymerization catalysts and agents, cellulose, and alkaline salts.

The invention also encompasses a method of scrubbing gas to remove carbon dioxide comprising the step of placing a gas comprising carbon dioxide in contact with the solid adsorbent for scrubbing carbon dioxide material in a shaped form, pellet, cluster or extrudate having a reaction product of an organic amine and a support particle wherein said shaped form, pellet, cluster and extrudate has at least one dimension greater than about 0.1 mm. The method also includes a shaped form, pellet, cluster or extrudate constructed and arranged as a fixed bed through which said gas is compelled through.

Having described the invention with reference to certain preferred embodiments, other embodiments will become apparent to one skilled in the art from consideration of the specification. The invention is further defined by reference to the following examples describing in detail the synthesis of solid adsorbent for scrubbing carbon dioxide. It will be apparent to those skilled in the art that many modifications, both to materials and methods, may be practiced without departing from the scope of the invention.

EXAMPLES

Example 1: Pellets

The pellets, such as those of FIG. 1 (11), are made without the use of organic solvents. Dilute polyethylenimine (PEI) is mixed with deionized water in a weight ratio of 1:7 PEI:$H_2O$. The PEI and water are combined in an industrial mixer, such as those described in Catalyst Manufacture. Once thoroughly blended, fumed silica (Cab-O-Sil© from Cabot Corporation) is gradually added to the mixture in a 10:4 weight ratio of fumed silica:PEI. During mixing the mixture forms a thick paste. This paste is extruded using a simple lab syringe or 1-2 mm mesh screens. The extruded paste forms pellets with 1 mm and 2 mm diameter. Thus, the pellets formed from such extrusions have at least one dimension which is greater than 1 mm. The pellets were dried on a tray in a lab oven.

Example 2: Solid Forms

Solid forms of amine-bound fumed silica (FS) are made without the use of organic solvents. Using the mixing process described in Example 1, a thick paste of water, PEI, and fumed silica was made. Thereafter, the paste is placed in molds shaped as discs. The discs are approximately 50 mm in diameter and 20 mm in height. The drying step was performed on a hot plate.

Example 3: Drying

The pellets or molded shapes of examples 1 and 2 are dried at elevated temperatures for several hours to form a solid adsorbent for scrubbing carbon dioxide. The solid adsorbent for scrubbing carbon dioxide is a brittle, rigid, and highly porous solid that is easy to manipulate and distribute. The discs and pellets were dried at 90° C. for over 4 hours.

FIG. 2 illustrates the solid adsorbent for scrubbing carbon dioxide of the invention in the form of pellets.

Example 4: Testing Carbon Dioxide Absorbing Properties

Figure 4:
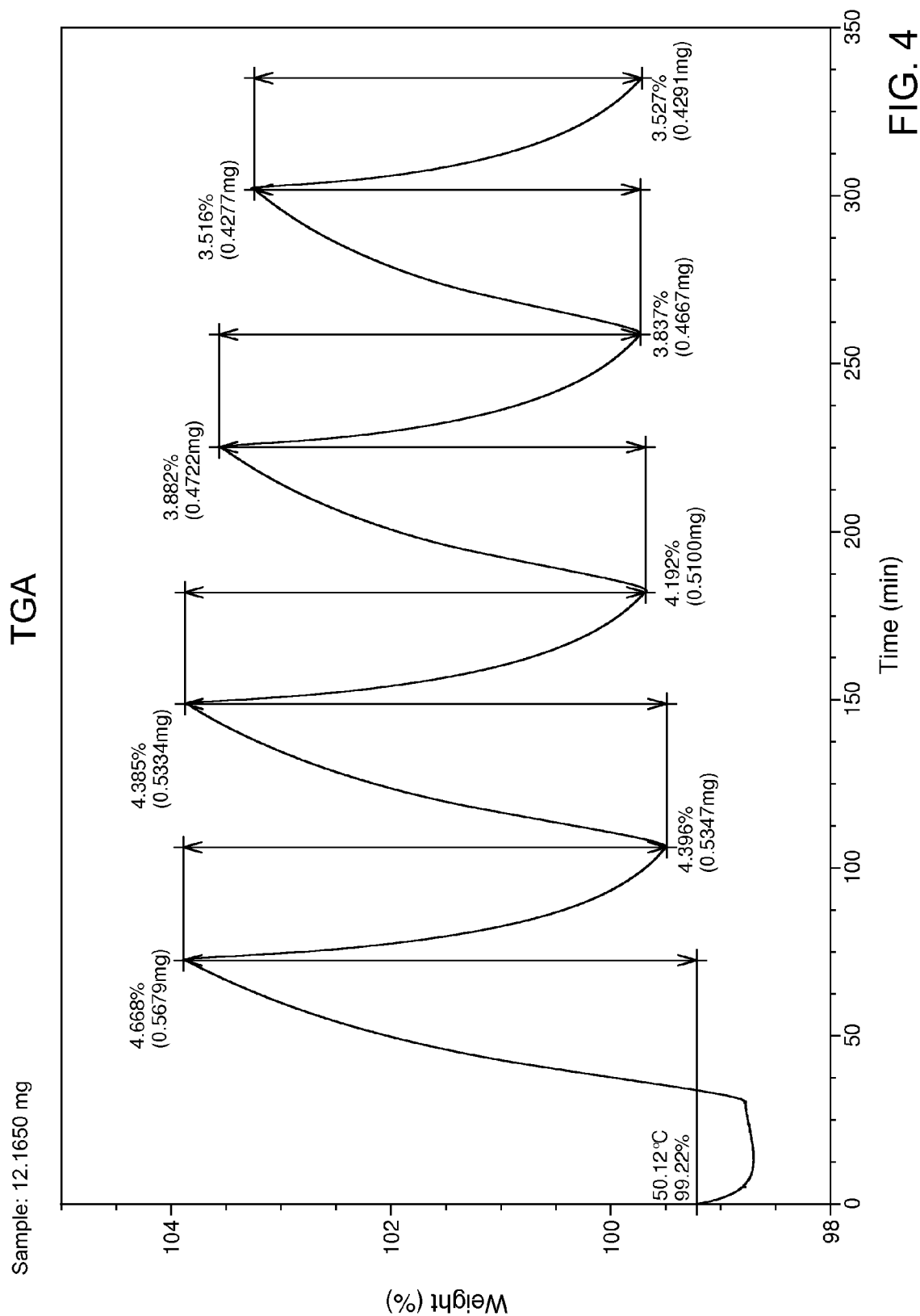
FIG. 4 illustrates a graph of a thermogravimetric analysis (TGA) of the material of Example 1. The vertical axis shows the change in sample weight over time under exposure to a flow of air with controlled concentration of carbon dioxide and controlled temperature. Each measurement exhibits adsorption and desorption repetitive cycles of 30 minutes each. In this example desorption was carried out at 50° C. under dry compressed air and adsorption at 30° C. under dry and compressed air containing 1000 ppm $CO_2$.

The solid adsorbent for scrubbing carbon dioxide in the shape of pellets was tested to determine the carbon dioxide absorbing properties. The product of example 1 was test under the following conditions: adsorption and desorption repetitive cycles of 30 minutes each. Desorption was carried out at 50° C. under dry compressed air and adsorption was carried out at 30° C. under dry and compressed air containing 1000 ppm carbon dioxide. FIG. 4 illustrates a TGA graph of this process, where the change percent in weight of material (X axis) changes as carbon dioxide is adsorbed over time (Y axis).

Figure 3:
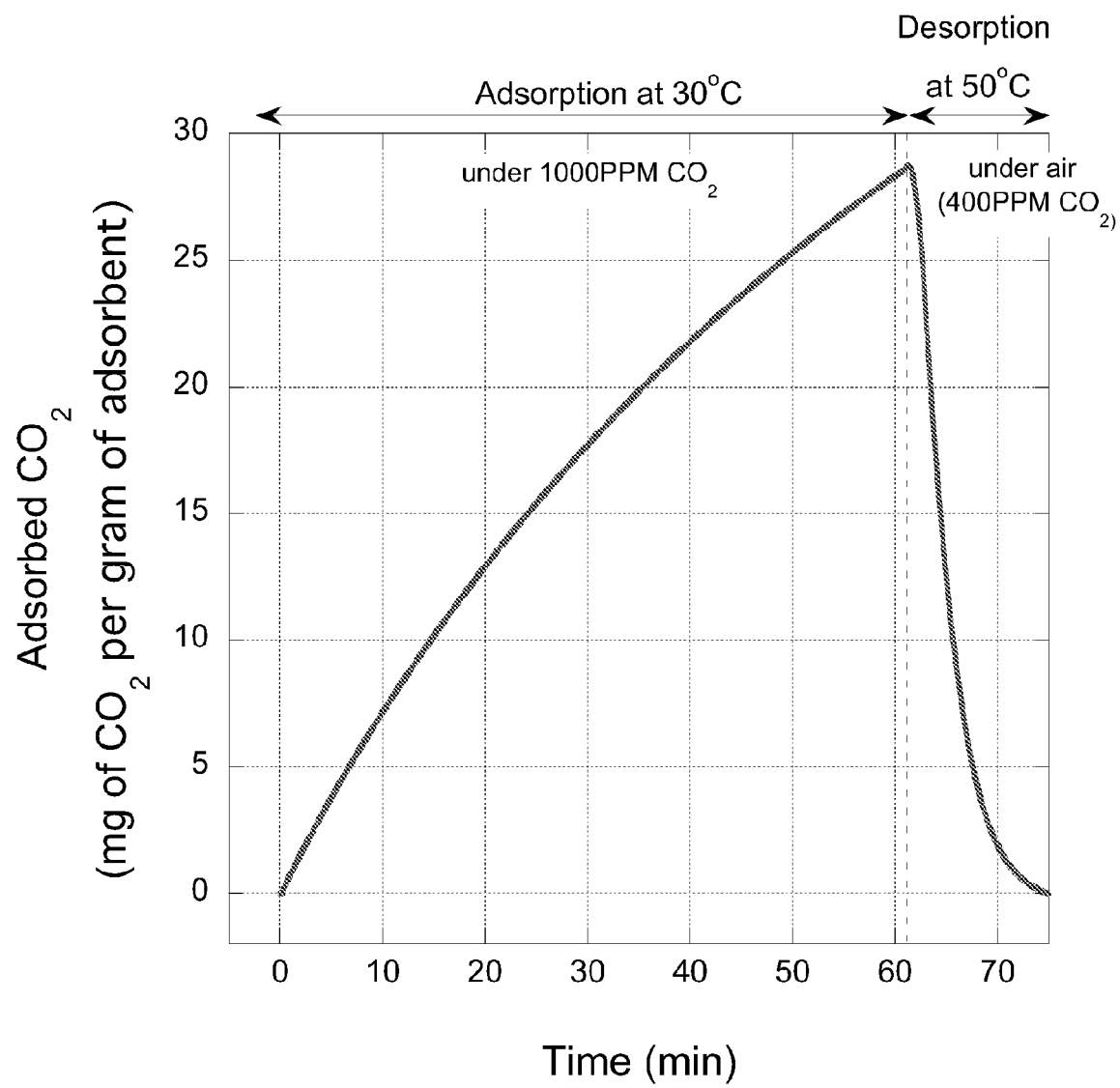
FIG. 3 illustrates the capacity of an adsorbent for scrubbing carbon dioxide to adsorbed carbon dioxide over time, wherein the adsorbed carbon is measured in mg of $CO_2$ per gram of product over 75 minutes.

The results of the above-described testing are graphically illustrated in FIG. 3. FIG. 3 depicts the results of thermogravimetric analysis (TGA) of the $CO_2$ adsorption properties of the solid sorbent for scrubbing carbon dioxide of the present invention. The material has performance comparable to solvent-formed FS-PEI with $CO_2$ adsorption capacity over 3% weight per weight, and has the mechanical form that is conducive to fixed bed flow adsorption.

Example 5: Order of Mixing

In this example, the order of mixing the reactants of Example 1 is altered. Following the amounts used in Example 1, fumed silica is first mixed with deionized water, and the amine is added to the fumed silica-water mixture to form a paste. This paste is then used to form an extrudate or solid form.

Example 6: Organic Amine

This example illustrates the substitution of other organic amines for PEI or as additional organic amines to PEI. Such other organic amines include but are not limited to ethanolamines, ethyleneamines such as triethylenetetramine (TETA), tetraethylenepentamine (TEPA) or pentaethylenehexamine (PEHA), linear-chain polyethylenimine, and sterically hindered amines such as 2-amino-2-methyl-1-propanol (AMP). Such organic amines are used singularly in place of PEI, or in combination with PEI or in combination with each other.

Example 7: Additives Details

Additives such as polyethylene glycol are added to the paste, or deionized water, or organic amine or to the support particles.

Example 8: Fumed Alumina

The pellets, such as those of FIG. 1 (11), are made without the use of organic solvents and using a combination of fumed silica and alumina. Dilute polyethylenimine (PEI) is mixed with deionized water in a weight ratio of 1:7 PEI: $H_2O$. The PEI and water are combined in an industrial mixer. Once thoroughly blended, fumed silica and fumed alumina in a weight ratio of 3:1 is gradually added to the mixture in a 10:4 weight ratio of fumed silica and fumed alumina to PEI. During mixing the mixture forms a thick paste, which is extruded using a lab syringe of 1-2 mm mesh screen. The extruded paste forms elongated rods with 1 mm and 2 mm diameter and varying lengths. Thus, the elongated rods formed from such extrusions have at least one dimension which is greater than 1 mm. The elongated rods were dried on a tray inside a conventional lab oven at 90° C.

It was found that a mix of 3:1 (silica to alumina) produced pellets that exhibited greater $CO_2$ adsorption capacity than silica-only pellets.

What is claimed:

1. A malleable material consisting essentially of a liquid amine, a plurality of support particles, and water.

2. The malleable material of claim 1, wherein the amine is polyethylenimine (PEI), aziridine, ethanolamine, diethanolamine, an ethylenamine, or mixtures thereof.

3. The malleable material of claim 1, wherein the support particles are composed of carbon, silica, alumina, or mixtures thereof.

4. A solid sorbent for scrubbing air consisting essentially of a plurality support particles and at least one organic amine, wherein the organic amine binds the plurality of support particles to one another and into shaped forms larger than a single support particle.

5. The sorbent of claim 4, wherein the amine is polyethylenimine (PEI), aziridine, ethanolamine, diethanolamine, an ethylenamine, or mixtures thereof.

6. The sorbent of claim 4, wherein the support particles are composed of carbon, silica, alumina, or mixtures thereof.

7. The sorbent of claim 4, wherein the shaped form has at least one dimension greater than about 0.1 mm.

8. The sorbent of claim 4, wherein the shaped form has at least one dimension greater than about 10 mm.

9. The sorbent of claim 4, wherein the shaped form is a pellet, filament, sheet, globules, cylinder, sphere, spheroid, ellipsoid, cube, rectangle, triangle, ring, or disc.

10. A method of making the solid sorbent for scrubbing air of claim 4, comprising:
    adding at least one liquid amine to a solvent and a plurality of support particles to form a malleable material;
    forming the malleable material into shapes or granules of substantially similar form and dimensions; and
    drying the formed shapes to remove substantially all of the solvent.

11. The method of claim 10, wherein the dried formed shapes are about 20% to 60% by weight organic amine and about 40% to 80% by weight support particle.

12. The method of claim 10, wherein the malleable material is formed into shapes by extrusion, molding, cutting or pelletization.

13. The method of claim 10, wherein the malleable material is formed into pellets, filaments, sheets, globules, cylinders, spheres, spheroids, ellipsoids, cubes, blocks, rectangles, pyramids, ring, or discs.

14. The malleable material of claim 1, wherein the material is flowable.

15. The malleable material of claim 1, wherein the material has a large solids content held in suspension.

16. The malleable material of claim 1, wherein the material has a viscosity in the range of about 10,000 cP to about 10,000,000 cP.

17. The method of claim 10, wherein the solvent is water.

* * * * *